(12) United States Patent
Filippo et al.

(10) Patent No.: US 11,096,399 B2
(45) Date of Patent: Aug. 24, 2021

(54) PROCESS FOR INCREASING HOMOGENEITY IN PROPERTIES OF BRINE-SALTED CHEESES

(71) Applicant: Royal Bel Leerdammer B.V., Schoonrewoerd (NL)

(72) Inventors: Acerbi Filippo, Montpellier (FR); Veerle Buijs, Ijsselstein (NL)

(73) Assignee: Royal Bel Leerdammer B.V., Schoonrewoerd (NL)

(*) Notice: Subject to any disclaimer, the term of this patent is extended or adjusted under 35 U.S.C. 154(b) by 308 days.

(21) Appl. No.: 15/745,402

(22) PCT Filed: Jul. 13, 2016

(86) PCT No.: PCT/EP2016/066651
§ 371 (c)(1),
(2) Date: Jan. 16, 2018

(87) PCT Pub. No.: WO2017/012953
PCT Pub. Date: Jan. 26, 2017

(65) Prior Publication Data
US 2018/0213810 A1    Aug. 2, 2018

(30) Foreign Application Priority Data
Jul. 17, 2015 (EP) .................................. 15177353

(51) Int. Cl.
*A23C 19/06* (2006.01)
*A23C 19/14* (2006.01)
(Continued)

(52) U.S. Cl.
CPC ........ *A23C 19/064* (2013.01); *A23C 19/0688* (2013.01); *A23C 19/14* (2013.01);
(Continued)

(58) Field of Classification Search
CPC ... A23C 19/064; A23C 19/166; A23C 19/163; A23C 19/0688; A23C 19/14;
(Continued)

(56) References Cited

U.S. PATENT DOCUMENTS 2,864,704 A    12/1958  Feutz et al.
2006/0216373 A1*  9/2006  Mehnert ............... A23C 19/064
                                                  426/36
(Continued)

FOREIGN PATENT DOCUMENTS

EP    0492716 A1    7/1992
EP    1437047 A1    7/2004
(Continued)

OTHER PUBLICATIONS

Formal Human Translation of Sailer EP 1437047. Published Jul. 2002. (Year: 2004).*

*Primary Examiner* — Ericson M Lachica
(74) *Attorney, Agent, or Firm* — Knobbe, Martens, Olson & Bear, LLP

(57) ABSTRACT

A method is for manufacturing brine-salted cheese with a homogeneous salt distribution and/or organic acid distribution and/or eyes distribution and/or texture on one axis of the cheese. The method includes, before a brining, applying a hydrophobic barrier on the entire outer parts of the cheese, which are located at the ends of the cheese axis. The hydrophobic barrier is kept on the cheese outer parts at least during part of the brining.

9 Claims, 8 Drawing Sheets

(51) Int. Cl.
   *A23C 19/16* (2006.01)
   *A23C 19/064* (2006.01)
   *A23C 19/068* (2006.01)

(52) U.S. Cl.
   CPC ............ *A23C 19/16* (2013.01); *A23C 19/163* (2013.01); *A23C 19/166* (2013.01)

(58) Field of Classification Search
   CPC ......... A23C 19/16; A01J 25/00; A01J 25/001; A01J 25/002; A01J 25/12; A01J 25/123; A01J 25/126; A01J 25/13; A01J 25/15; A01J 25/16; A01J 25/162; A01J 25/165; A01J 25/167; A01J 27/00; A01J 27/005; A01J 27/02; A01J 27/04; A01J 27/045; A23P 20/00; A23P 20/19
   See application file for complete search history.

(56) References Cited

U.S. PATENT DOCUMENTS

| | | | | |
|---|---|---|---|---|
| 2016/0050878 | A1* | 2/2016 | Pennarun | A23C 19/084 426/90 |
| 2016/0213051 | A1* | 7/2016 | Stork | A21D 15/08 |
| 2017/0000077 | A1* | 1/2017 | Spijkerman | A01J 25/123 |
| 2017/0202173 | A1* | 7/2017 | Spijkerman | A01J 25/123 |

FOREIGN PATENT DOCUMENTS

| | | | | |
|---|---|---|---|---|
| EP | 1464232 A1 | * | 10/2004 | ............. A23P 20/19 |
| EP | 2272376 A1 | * | 1/2011 | ......... A23C 19/0688 |
| WO | WO-03101214 A1 | * | 12/2003 | ......... A22C 13/0013 |
| WO | WO 2008/110550 A1 | | 9/2008 | |

\* cited by examiner

Horizontal composition distribution, without upper and side end rind, but with real end rind (scraped off amf layer)

Vertical composition distribution, with upper and side end rind

PROCESS FOR INCREASING HOMOGENEITY IN PROPERTIES OF BRINE-SALTED CHEESES

FIELD

The present invention concerns a method for manufacturing brine-salted cheeses, in particular ripened brine-salted cheeses, with a homogeneous salt distribution and/or organic acid distribution and/or eyes distribution and/or texture on one axis of said cheese, wherein the method comprises, before a brining step, a step of applying a hydrophobic barrier on the whole outer parts of said cheese which are located at the ends of said cheese axis, and said hydrophobic barrier is kept on said cheese outer parts at least during part of the brining step.

BACKGROUND

Operations which aim to include certain amounts of solutes and/or ions into foodstuff are popular among food industries. The latter compounds play specific roles in the food matrix and their activity highly depends on the amount absorbed by the product. In some cases, excess of solutes and/or ions absorption leads to undesired phenomena which take place on the food matrix during or after the above mentioned osmotic based operation. The need of controlling the amount of solutes and/or ions which are taken up by the foodstuff during osmotic force based operations is taking root in the last years.

The brining operation is a well-known osmotic force based operation used within the food industries which has the purpose of allowing solute (salt) diffusion into the foodstuff. Brining is in particular widely used to produce brine-salted cheeses.

However, salt diffusion is generally not homogeneous over the whole cheese, the outer parts of the cheese displaying much higher salt concentrations than the center of the product. Such an inhomogeneity in salt concentration is undesired.

Furthermore, in ripened brine-salted cheeses, salt content influences the formation of eyes. Less or smaller eyes will grow close to the end rinds of brined parallelepiped-like cheeses because of the typical gradient induced by the mentioned salting operation and because the propionic acid fermentation (which leads to eye formation) is salt-dependent.

However, a perfect eye formation is a unique selling point for this kind of cheeses, in particular for Maasdam-type and Swiss-type cheese, and a very important quality parameter. Consequently, when slicing block cheeses, in particular rectangular block cheeses, the first slices, starting from the end rind, need to be handled as off-cut or waste, since they have no eyes and a flat salty taste, and thus do not meet the specification regarding eye formation and taste, as illustrated in FIG. 1. This issue leads to economic losses for the manufacturer.

SUMMARY

There is thus an important need for a process of manufacture of brine-salted cheese (1), in particular ripened brine-salted cheese, which displays a homogenous distribution of salt and/or eyes (2).

This need is met by the present invention.

The present invention arises from the unexpected finding by the inventors that it is possible to obtain a homogeneous salt distribution and thereby a homogeneous organic acid distribution and/or eyes distribution and/or texture on an axis of a brine-salted cheese by applying, before the brining step, a hydrophobic barrier, typically a barrier comprising a waxy layer, such as a layer comprising anhydrous milk fat, covered by a protective layer, such as a plastic layer, on the whole outer parts of said cheese located at the ends of said cheese axis.

Furthermore, the inventors demonstrated that, because of the lower salt content in the end rinds (2), these rinds also displayed higher moisture content and a better texture. Accordingly, the present method also enables manufacturing cheeses with a homogeneous texture and therefore more economical.

Without wishing to be bound by theory, this hydrophobic barrier is believed to act as a mechanical barrier during the brining step, blocking moisture and salt migration during brining. In particular, when this hydrophobic barrier is applied only on the outer parts of the cheese located at the ends of one axis, it does not block moisture and salt migration on the other axis of the cheese, leading to a homogeneous salt distribution and/or organic acid distribution and/or eyes distribution and/or texture on only one axis of the cheese.

The present invention thus concerns a method for manufacturing brine-salted cheese with a homogeneous salt distribution and/or organic acid distribution and/or eyes distribution and/or texture on one axis of said cheese, wherein the method comprises, before a brining step, a step of applying a hydrophobic barrier on the whole outer parts of said cheese which are located at the ends of said cheese axis, and said hydrophobic barrier is kept on said cheese outer parts at least during part of the brining step.

In a particular embodiment, the method of the invention is for manufacturing brine-salted cheese with a homogeneous salt distribution and/or organic acid distribution and/or eyes distribution and/or texture on only one axis of said cheese, and comprises, before a brining step, a step of applying a hydrophobic barrier only on the whole outer parts of said cheese which are located at the ends of said cheese axis, and said hydrophobic barrier is kept on said cheese outer parts at least during part of the brining step.

Another object of the invention concerns a brine-salted cheese likely to be obtained by the method of the invention.

It further concerns a brine-salted cheese, in particular a ripened brine-salted cheese, displaying a homogeneous salt distribution and/or organic acid distribution and/or eyes distribution on only one axis.

DETAILED DESCRIPTION

Brine-Salted Cheese

As used herein, the term "brine-salted cheese" refers to any cheese produced by a method of manufacture including at least a brining step, as defined below.

The brine-salted cheese obtained in the context of the invention may be a soft, a semi-soft, a medium-hard, a semi-hard or a hard cheese.

Examples of soft brine-salted cheeses are well-known from the skilled person and include Abbaye de Tamié, Munster cheese, Feta, Bondost cheese and Chevrotin.

Examples of semi-soft brine-salted cheeses are well-known from the skilled person and include Mozzarella, Oka cheese, Limburger and Saint-Nectaire.

Examples of medium-hard brine-salted cheeses are well-known from the skilled person and include Duhallow cheese and Emmental cheese.

Examples of semi-hard brine-salted cheeses are well-known from the skilled person and include Maaslander, Halloumi, Herrgårdsost, Maredsous cheese, Svecia, Tzfat cheese, Edam, Leerdammer, Maasdam cheese, Gouda cheese, Ibores cheese and Leyden cheese.

Examples of hard brine-salted cheeses are well-known from the skilled person and include Appenzeller cheese, Beaufort cheese, Berner Alpkäse, Gruyère cheese, Parmesan cheese, Swaledale cheese and Teviotdale cheese.

Preferably, the brine-salted cheese obtained in the context of the invention is a cheese with proprionic fermentation.

Cheeses with proprionic fermentation are well-known from the skilled person and for example defined in the book "Cheese Chemistry, Physics and Microbiology", written by P. F. FOX., $3^{rd}$ edition in 2004 (Elsevier Academic Press, Amsterdam).

Cheeses with propionic acid fermentation are often called Swiss-type cheeses. They are visually characterized by having round regular holes known as eyes (2), which vary in terms of size from medium to large. Swiss-type cheeses notably include Emmental-style cheese, Jarlsberg-style cheese and Maasdammer (leading brand Leerdammer). Their body and texture correspond to those of hard and semi-hard cheeses.

In a preferred embodiment, the brine-salted cheese obtained in the context of the invention is a ripened brine-salted cheese.

By "ripened brine-salted cheese" is meant herein any cheese produced by a method of manufacture including at least a brining step, as defined below, and a ripening step, as defined below.

Preferably, the ripened brine-salted cheese obtained in the context of the invention is a cheese with propionic fermentation, as defined above, in particular a Maasdammer cheese.

The brine-salted cheese or ripened brine-salted cheese obtained in the context of the invention may be in any form, in particular in the form of a rectangular block, a square block, an oval block, an ellipse block or a wheel.

In a particular embodiment, the brine-salted cheese or ripened brine-salted cheese is in the form of a rectangular block.

The brine-salted cheese or ripened brine-salted cheese obtained in the context of the invention is characterized by the fact that it displays a homogeneous salt distribution and/or organic acid distribution and/or eyes distribution and/or texture over at least one axis, preferably over only one axis.

By "homogenous salt distribution on one axis" is meant herein that the salt content, in particular the salt content originating from the brining solution with which the cheese was contacted during the brining step, is essentially the same over one whole axis of the cheese, from the ends of the cheese on this axis to the middle of the cheese on this same axis. Preferably, the difference in salt content between the ends of the cheese on this axis and the middle of the cheese on this same axis is less than 15%. Still preferably, in particular when the cheese is a Maasdammer cheese, the salt content (NaCl in dry matter) is comprised between 1.5 and 3% w/w over one whole axis of said cheese, more preferably between 2 and 5% w/w.

By "homogenous organic acid distribution on one axis" is meant herein that the organic acid content, in particular the proprionic acid content and/or the succinic acid content, is essentially the same over one whole axis of the cheese, from the ends of the cheese on this axis to the middle of the cheese on this same axis. Preferably, the difference in organic acid content, in particular in propionic acid content and/or in succinic acid content, between the ends of the cheese on this axis and the middle of the cheese on this same axis is less than 20%.

By "homogenous eyes distribution on one axis" is meant herein that the number and size of eyes in the cheese is essentially the same over one whole axis of the cheese, from the ends of the cheese on this axis to the middle of the cheese on this same axis.

By "homogenous texture on one axis" is meant herein that the texture of the cheese, in particular its smoothness, firmness and/or elasticity, is essentially the same over one whole axis of the cheese, from the ends of the cheese on this axis to the middle of the cheese on this same axis.

Preferably, the brine-salted cheese or ripened brine-salted cheese obtained in the context of the invention comprises a hydrophobic barrier, as defined below, on the whole outer parts of the cheese which are located at the ends of at least one axis of said cheese, said axis being the at least one over which salt and/or organic acid and/or eyes is(are) homogeneously distributed.

In a particular embodiment, the brine-salted cheese or ripened brine-salted cheese obtained in the context of the invention comprises a hydrophobic barrier, as defined below, only on the whole outer parts of the cheese which are located at the ends of one axis of said cheese, said axis being the one over which salt and/or organic acid and/or eyes is(are) homogeneously distributed.

In a particular embodiment, the brine-salted cheese or ripened brine-salted cheese obtained in the context of the invention displays a homogeneous salt distribution and/or organic acid distribution and/or eyes distribution and/or texture over only one axis, while inhomogeneous salt distribution and/or organic acid distribution and/or eyes distribution on the other axis of the cheese is maintained.

Such an inhomogeneous salt distribution and/or organic acid distribution and/or eyes distribution on the other axis of the cheese may be looked for, in particular in the case of cheeses in the form of rectangular blocks, because the inhomogeneous distribution of eyes on the other axis of such cheeses resembles the distribution of eyes in wheel cheeses, which are considered by the consumers as more "natural".

Accordingly, in a preferred embodiment, when the brine-salted cheese or ripened brine-salted cheese obtained in the context of the invention is in the form of a rectangular block (4), the hydrophobic barrier (5), as defined below, is only on the two whole opposite outer parts of said cheese which are located at the ends of the longitudinal axis of said cheese.

Such an embodiment is illustrated on FIG. 2.

Still preferably, in that embodiment, the cheese has a homogeneous salt distribution and/or organic acid distribution and/or eyes distribution and/or texture in the longitudinal axis and an inhomogeneous salt distribution and/or organic acid distribution and/or eyes distribution in the lateral and vertical axis.

Similarly, in a preferred embodiment, when the brine-salted cheese or ripened brine-salted cheese obtained in the context of the invention is in the form of a wheel (6), the hydrophobic barrier (5), as defined above, is only on the whole outer circumference of the wheel.

Such an embodiment is illustrated on FIG. 3.

Still preferably, in that embodiment, the cheese has a homogeneous salt distribution and/or organic acid distribution and/or eyes distribution in the radial axis and an inhomogeneous salt distribution and/or organic acid distribution and/or eyes distribution in the height axis.

Method of Manufacture

The method of manufacture according to the invention enables obtaining a brine-salted cheese, as defined in the section "Brine-salted cheese" above, with a homogeneous salt distribution and/or organic acid distribution and/or eyes distribution and/or texture, as defined in the section "Brine-salted cheese" above, on one axis of said cheese, preferably on only one axis of said cheese.

When the method of the invention is for manufacturing brine-salted cheese with a homogeneous salt distribution and/or organic acid distribution and/or eyes distribution and/or texture on only one axis of said cheese, the inhomogeneous salt distribution and/or organic acid distribution and/or eyes distribution on the other axis of the cheese is preferably maintained, as defined in the section "Brine-salted cheese" above.

By "outer parts of the cheese which are located at the ends of one cheese axis" is meant herein the outer sides of the cheese located at each end of the axis of the cheese on which a homogeneous salt distribution and/or organic acid distribution and/or eyes distribution and/or texture is looked for.

As will be understood by the skilled person, the number and shape of these outer parts will depend on the form of the cheese.

For example, if the cheese is a rectangular block or a square block, the outer parts of the cheese which are located at the ends of one cheese axis will be two opposite outer parts of the cheese located at the ends of the longitudinal, the lateral or the vertical axis, preferably the longitudinal axis, of the cheese.

However, if the cheese is an oval block, an ellipse block or a wheel, the outer parts of the cheese which are located at the ends of one cheese axis will be either one outer part corresponding to the circumference of the cheese (outer part located at the ends of the radial axis) or two opposite outer parts of the cheese located at the ends of the height axis, preferably the outer part corresponding to the circumference of the cheese.

These different embodiments are illustrated on FIG. 4.

The hydrophobic barrier is applied on these whole outer parts. In other words, the totality of the mentioned outer parts is covered by the hydrophobic barrier.

As specified in the section "Brine-salted cheese" above, the cheese may be in the form of a rectangular block, a square block, an oval block, an ellipse block or a wheel.

In a preferred embodiment, when the cheese is in the form of a rectangular block, the hydrophobic barrier, as defined in the section "Hydrophobic barrier" below, is applied only on the two whole opposite outer parts of said cheese which are located at the ends of the longitudinal axis of the cheese, thereby enabling obtaining a homogeneous salt distribution and/or organic acid distribution and/or eyes distribution and/or texture on the longitudinal axis of the cheese, while maintaining an inhomogeneous salt distribution and/or organic acid distribution and/or eyes distribution in the lateral and vertical axis.

Such an embodiment is illustrated on FIG. 2.

In another preferred embodiment, when the cheese is in the form of a wheel, the hydrophobic barrier, as defined in the section "Hydrophobic barrier" below, is applied only on the whole outer circumference of the wheel, thereby enabling obtaining a homogeneous salt distribution and/or organic acid distribution and/or eyes distribution and/or texture in the radial axis of the cheese, while maintaining an inhomogeneous salt distribution and/or organic acid distribution and/or eyes distribution in the height axis.

Such an embodiment is illustrated on FIG. 3.

The step of applying the hydrophobic barrier may be carried out by any conventional technique well-known from the skilled person.

In a preferred embodiment, the temperature of said outer parts of the cheese which are located at the ends of said cheese axis and on which the hydrophobic barrier, as defined in the section "Hydrophobic barrier" below, is applied, is from 20 to 35° C. during the application of the hydrophobic barrier.

More preferably, the temperature of said outer parts is from 21 to 34° C., from 22 to 33° C., from 23 to 32° C., from 24 to 31° C., from 25 to 30° C., from 26 to 29° C. or from 27 to 28° C.

By "brining step" is meant herein any step wherein a cheese is soaked, washed or contacted with brine.

In the method of the invention, the hydrophobic barrier is kept on said cheese outer parts at least during part of the brining step. Preferably, the hydrophobic barrier is kept on said cheese outer parts at least during the whole brining step.

The method of the invention may comprise one or several brining steps. In a preferred embodiment, when the method of the invention comprises several brining steps, the hydrophobic barrier is kept on said cheese outer parts at least during part of one brining step. Still preferably, when the method of the invention comprises several brining steps, the hydrophobic barrier is kept on said cheese outer parts at least during one whole brining step. In other preferred embodiments, when the method of the invention comprises several brining steps, the hydrophobic barrier is kept on said cheese outer parts at least during part of each brining step. Still preferably, when the method of the invention comprises several brining steps, the hydrophobic barrier is kept on said cheese outer parts at least during all the brining steps.

When the brine-salted cheese to be produced is a ripened brine-salted cheese, the method of the invention further comprises, after the brining step(s), a ripening step.

By "ripening step" is meant herein any step of maturation of cheese involving bacteria and enzymes of the milk, lactic culture, rennet, lipases, added molds and/or yeasts and environmental contaminants and leading to physical, chemical, microbiological, and/or salt content changes in the cheese.

The method of the invention may comprise any other conventional step used in the manufacture of brine-salted cheese or of ripened brine-salted cheese.

For example, the method of the invention may comprise a curdling step, a heating step, a molding step, a pressing step, a whey drainage step, a brining step, a ripening step, a washing step, a slicing step and a packaging step.

Typically, the method of the invention comprises the following steps:
   a step of pasteurizing the milk,
   a curdling step,
   a heating step, preferably at a temperature inferior to 40° C.,
   a molding step,
   a pressing step,
   a step of applying the hydrophobic barrier as defined above,
   a brining step, preferably for at least 2 days, and
   a ripening step.

In a particular embodiment, the hydrophobic barrier is removed after the brining step or after the last brining step.

Alternatively, the hydrophobic barrier may be kept on the cheese at the end of the method of manufacture.

Hydrophobic Barrier

In the context of the invention, the term "hydrophobic barrier" refers to a mechanical barrier, optionally constituted of several compounds and/or several layers, which, as a whole, repels water and/or is not soluble in water.

Preferably, the hydrophobic barrier comprises or consists of two layers, a waxy layer and a protective layer.

Still preferably, the hydrophobic barrier comprises or consists of a waxy layer covered by a protective layer. Still preferably, the waxy layer is in contact with said cheese outer parts.

Alternatively, the hydrophobic barrier may comprise or consist of a protective layer, preferably a casein layer, covered by a waxy layer. In this particular embodiment, the protective layer, in particular the casein layer, is preferably in contact with said cheese outer parts.

Waxy Layer

In the context of the invention, the term "waxy layer" refers to a layer comprising or consisting of lipids, fats, waxes or mixtures thereof.

Preferably, the waxy layer used in the context of the invention has a crystallization and congealing temperature equal or inferior to 90° C., more preferably equal or inferior to 80° C., 70° C., 60° C., 50° C., 40° C., 30° C. or 25° C.

As used herein, the term "crystallization temperature" refers to the temperature at which waxy crystalline particles begin to form from the waxy liquid phase. The "crystallization temperature" can be determined by Differential Scanning calorimetry (DSC).

As used herein, the term "congeal temperature", "congealing temperature" or "congeal point" refers to the temperature at which a molten sample of the waxy layer starts to form crystals. The "congeal point" can be determined according to ASTM procedure ASTM D-938 "Standard test method for congealing point of petroleum waxes, including petrolatum".

Preferably, the waxy layer used in the context of the invention comprises or consists of a native animal fat, a blend of animal fats, a vegetal fat, a blend of vegetal fats, a mineral wax from non-renewable origin, a bio sourced wax from animal or vegetal origin, a petroleum wax, a synthetic wax or blends of these waxes.

Examples of native animal fats include dairy fats and goose fats.

Examples of vegetal fats include vegetable oils such as palm oil, soybean oil, rapeseed oil, sunflower seed oil, peanut oil, cottonseed oil, palm kernel oil, coconut oil, olive oil, corn oil, grape seed oil, nut oils, linseed oil, rice bran oil, safflower oil and sesame oil.

In a particular embodiment, the waxy layer comprises or consists of a dairy fat and/or a goose fat.

In a particularly preferred embodiment, the waxy layer is a dairy fat layer.

By "dairy fat layer" is meant herein a layer comprising or consisting of a dairy fat, such as anhydrous milk fat or butter.

The use of a dairy fat layer as waxy layer is particularly useful because it enables using materials which are conventional ingredients of cheeses, thereby avoiding mentioning additional additives in the cheese composition.

In a particular embodiment, the dairy fat layer comprises or consists of anhydrous milk fat or butter. More preferably, the dairy fat layer comprises or consists of anhydrous milk fat.

By "anhydrous milk fat" is meant herein the dairy-based fat fraction obtained by removing the moisture and the non-fat milk solids from milk fat, and containing less than 0.2 wt % of water.

Preferably, the anhydrous milk fat is an anhydrous milk fat with a drop point in the range of 5 to 50° C. or a mixture of anhydrous milk fats with average drop points in the range of 5 to 50° C.

In the context of the invention, the term "drop point" refers to the temperature at which a solid fat softens to the point where it will flow and drop out of a specially designed container. Techniques to determine the drop point of a fat are well-known from the skilled person and for example described in Mertens et al. (1972) *Journal of the American Oil Chemists Society* 49:366-370.

More preferably, the anhydrous milk fat used in the context of the invention is an anhydrous milk fat with a drop point in the range of 10 to 45° C., more preferably in the range of 15 to 43° C., in the range of 20 to 42° C., in the range of 25 to 41° C., in the range of 30 to 40° C., in the range of 31 to 39° C., in the range of 32 to 38° C., in the range of 33 to 37° C., in the range of 34 to 36° C. or in the range of 34 to 35° C., or a mixture of anhydrous milk fats with average drop points in the range of 10 to 45° C., more preferably in the range of 15 to 43° C., in the range of 20 to 42° C., in the range of 25 to 41° C., in the range of 30 to 40° C., in the range of 31 to 39° C., in the range of 32 to 38° C., in the range of 33 to 37° C., in the range of 34 to 36° C. or in the range of 34 to 35° C.

Examples of mineral waxes from non-renewable origin include ceresin and ozokerite.

Examples of bio sourced waxes from animal origin include beeswax, lanolin or wool wax, shellac wax and tallow.

Examples of bio sourced waxes from vegetal origin include Candelilla wax, carnauba wax, castor wax, Jojoba wax, rice bran wax, soy wax, tallow tree wax, palm tree wax and coconut wax.

Examples of petroleum waxes include paraffin wax, microcrystalline waxes and petroleum jelly.

Examples of synthetic waxes include polymer waxes such as polyethylene waxes, esters of pentaerythritol and fatty acids and polyvinyl esters of fatty acids; and Fischer-Tropsch waxes, i.e. synthetic waxes obtained from the Fischer Tropsch process.

In a particular embodiment, the waxy layer comprises or consists of a wax selected from the group consisting of beeswax, lanolin or wool wax, shellac wax, tallow, Candelilla wax, carnauba wax, Castor wax, Jojoba wax, rice bran wax, soy wax, tallow tree wax, palm tree wax, coconut wax, acetoglycerides wax, a polymer wax, such as esters of pentaerythritol and fatty acids, polyvinyl esters of fatty acids and polyethylene wax and synthetic waxes obtained from the Fischer Tropsch process.

In a particularly preferred embodiment, the waxy layer comprises or consists of beeswax.

The waxy layer used in the context of the invention may further comprise a filling agent.

Examples of suitable filling agents include silicates such as talc powder or kaolin powder, hydrophobic powder from mineral or non mineral source, dairy calcium powder, whey protein isolates, whey protein concentrates, milk protein isolates, milk protein concentrates, polyphenol suspensions, hydrophobic fatty acids grafted cellulose, phospholipids, mono- and/or di-glycerides, acetoglycerides and calcium lactate crystals.

Protective Layer

In the context of the invention, the term "protective layer" refers to a layer which protects the waxy layer, as defined above, from being disrupted, dissolved or dispersed by the brining solution with which the brine-salted cheese to be produced is contacted and which protects the brining solution with which the brine-salted cheese to be produced is contacted from any contamination originating from the waxy layer.

Preferably, the protective layer used in the context of the invention is a food grade protective layer, more particularly an edible protective layer or a non-edible food grade protective layer, in particular a non-edible food contact protective layer.

Features of food grade materials are well-known from the skilled person and for example defined in the US Code of Federal Legislation (CFR): 21 CFR 174-21 CFR 190, in particular in 21 CFR 174 and 21 CFR 175.

In a preferred embodiment, the protective layer comprises or consists of a plastic layer or a casein layer.

In a particularly preferred embodiment, the protective layer comprises or consists of a plastic layer.

The plastic layer may in particular comprise or consist of polyethylene, including high-density polyethylene and low-density polyethylene, polypropylene, polyisoprene, polybutadiene, polyethylene terephthalate, polyvinyl acetate and/or polyester. More preferably, the plastic layer comprises or consists of polyethylene, more particularly food grade polyethylene, still particularly food grade high-density polyethylene.

In another particularly preferred embodiment, the protective layer comprises or consists of a casein layer. Preferably, said casein layer comprises or consists of casein and optionally glycerol.

In a preferred embodiment, the protective layer has a thickness of from 1 to 100 μm, more preferably a thickness of from 2 to 90 μm, from 3 to 80 μm, from 4 to 70 μm, from 5 to 60 μm, from 6 to 50 μm, from 7 to 40 μm, from 8 to 30 μm, from 9 to 20 μm or of about 10 μm.

The inventors demonstrated that a very efficient hydrophobic barrier was constituted of a waxy layer comprising or consisting of anhydrous milk fat and a protective layer comprising or consisting of food grade polyethylene.

Accordingly, in a preferred embodiment the hydrophobic barrier comprises or consists of:
a waxy layer comprising or consisting of anhydrous milk fat with a drop point in the range of 5 to 50° C. or a mixture of anhydrous milk fats with average drop points in the range of 5 to 50° C., covered by
a protective layer comprising or consisting of food grade polyethylene, in particular food grade high density polyethylene.

In the method of manufacture of the invention, the waxy layer and the protective layer which constitutes the hydrophobic barrier may be applied on the cheese outer parts simultaneously or separately.

In particular, the waxy layer may first be applied on the cheese outer parts, and then covered by the protective layer. Alternatively, in particular when the protective layer is a casein layer, the protective layer may be first applied on the cheese outer parts, and then covered by the waxy layer.

Alternatively, the waxy layer and the protective layer may be applied simultaneously. In particular the waxy layer and the protective layer may be applied simultaneously, the protective layer covering the waxy layer or the waxy layer covering the protective layer (in particular when the protective layer is a casein layer) before the application on the cheese outer parts.

The present invention also concerns the use of a hydrophobic barrier, as defined above, to homogenize salt distribution and/or organic acid distribution and/or eyes distribution and/or texture in a brine-salted cheese, as defined in the section "Brine-salted cheese" above.

It further relates to the use of a hydrophobic barrier, as defined above, to increase moisture content in a brine-salted cheese, as defined in the section "Brine-salted cheese" above.

The present invention will be further illustrated by the figures and examples below.

EXAMPLES

Example 1

This example describes a typical method of manufacture of a Leerdammer cheese according to the invention.

During a conventional process of manufacture of Leerdammer cheese, after the pressing step and before the brining step, a rectangular Leerdammer Original cheese block was taken from the conveyor belt.

On both end rinds of the cheese (the two opposite small surfaced rinds of the longitudinal axis), a homogeneous layer of 7 grams of anhydrous milk fat (waxy layer) with a droppoint of 30-40° C. was rubbed. The temperature of the end rind of the cheese was approximately 30° C. at the time of application. This temperature caused the fat to slightly melt and provided it to be smeared on the end rind.

On top of this waxy layer, a layer of plastic foil (protective layer) with a thickness of 10 µm was placed. This layer had similar dimensions as the end rind creating a full surface barrier. With the use of a roller, the air is pushed out between the waxy layer and the protective layer whereby a nice adhesion was created.

The treated cheese was then placed back on the conveyor belt before the brine bath entrance. The cheese was then 'automatically' brined following the standard brining protocol of Leerdammer Original.

After about 20-150 hours of brining, the cheese was de-brined according to the standard protocol.

One week after pressing, it was measured that $92.52\pm7.03\%$ S/M (S/M=(NaCl in cheese×100)/(NaCl in cheese+moisture in cheese)) (N=6) was blocked by the hydrophobic barrier. Two weeks after pressing, it was measured that the moisture content in the cheese block was $40.91\pm0.22\%$ w/w instead of $40.64\pm0.38\%$ w/w in a non-treated cheese. This higher moisture content was also created by the hydrophobic barrier that limits the moisture migration out of the cheese during brining.

These product parameters led to a decrease in defective slices of approximately 60%.

Figure 1:
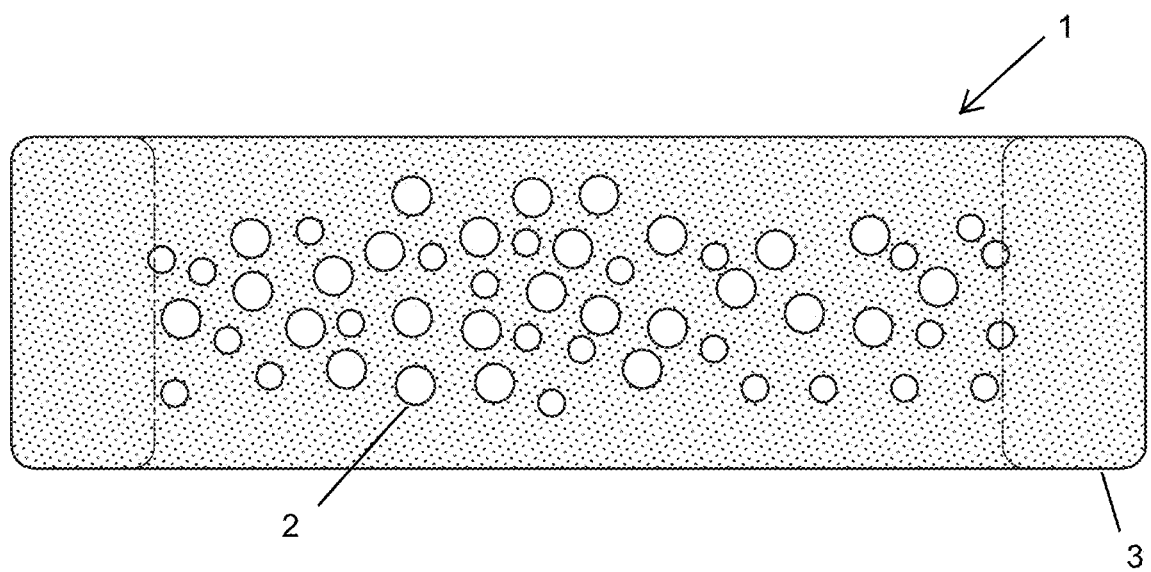
FIG. 1 is a scheme of eyes (2) distribution in a block of ripened brine-salted cheese (1) of the state of the art.
Figure 2:
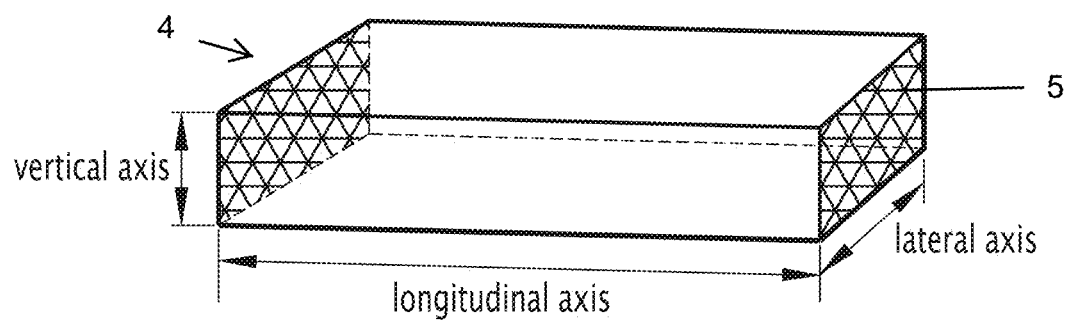
FIG. 2 is a scheme of a rectangular block cheese (4) wherein the hydrophobic layer (5) is applied only of the two whole opposite outer parts of the cheese which are located at the ends of the longitudinal axis (hashed zones).
Figure 3:
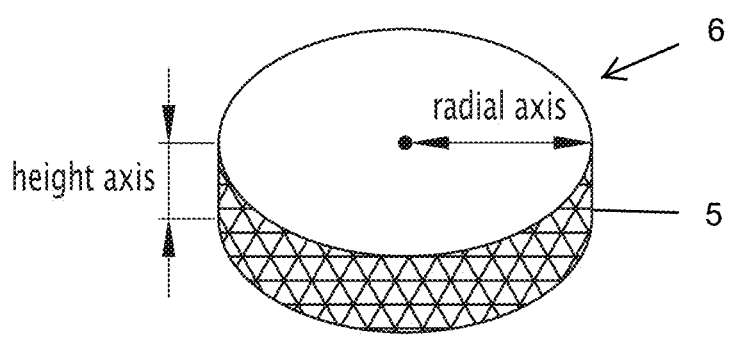
FIG. 3 is a scheme of a cheese wheel (6) wherein the hydrophobic layer (5) is applied only on the whole outer circumference of the cheese (hashed zone).
Figure 4:
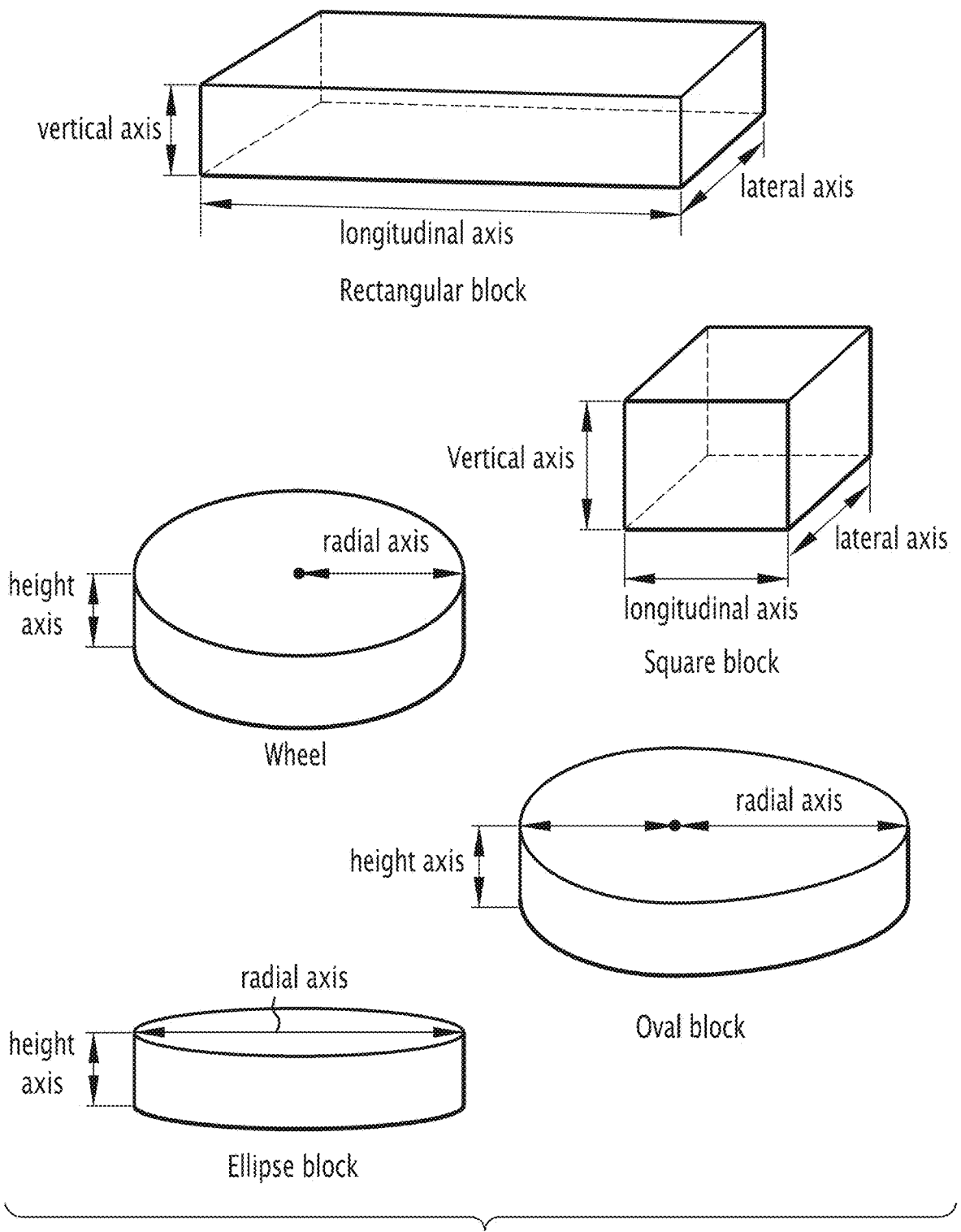
FIG. 4 is a scheme of different shapes of cheese block and the corresponding longitudinal, lateral, vertical, radial and/or height axis.
Figure 5:
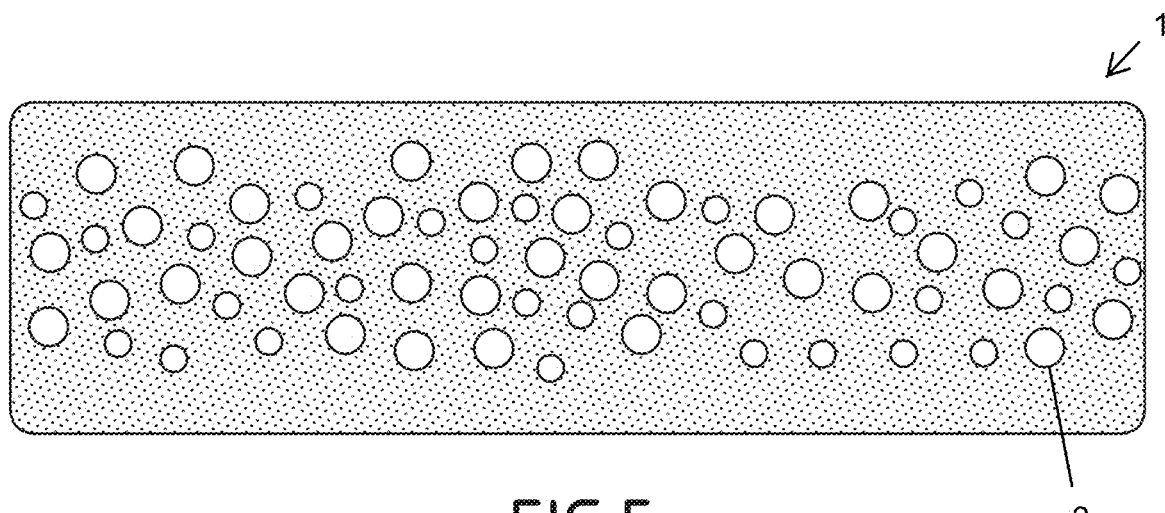
FIG. 5 is a scheme of the eyes (2) distribution in the cheese of the invention obtained in Example 1.

Furthermore a homogeneous cheese composition and eye (2) formation was observed in the longitudinal axis of the cheese block (1), as compared to a non-treated cheese, as illustrated on FIG. 5.

In the lateral and vertical direction, this homogeneity was not observed and not wanted. The inhomogeneity creates the natural cheese look of the slice.

Example 2

This example discloses the difference of composition between a cheese obtained with the method of the invention and a conventional cheese.

The hydrophobic barrier of the invention does not only have an influence on the eye formation itself, but also on the strongly related composition.

Figure 6:
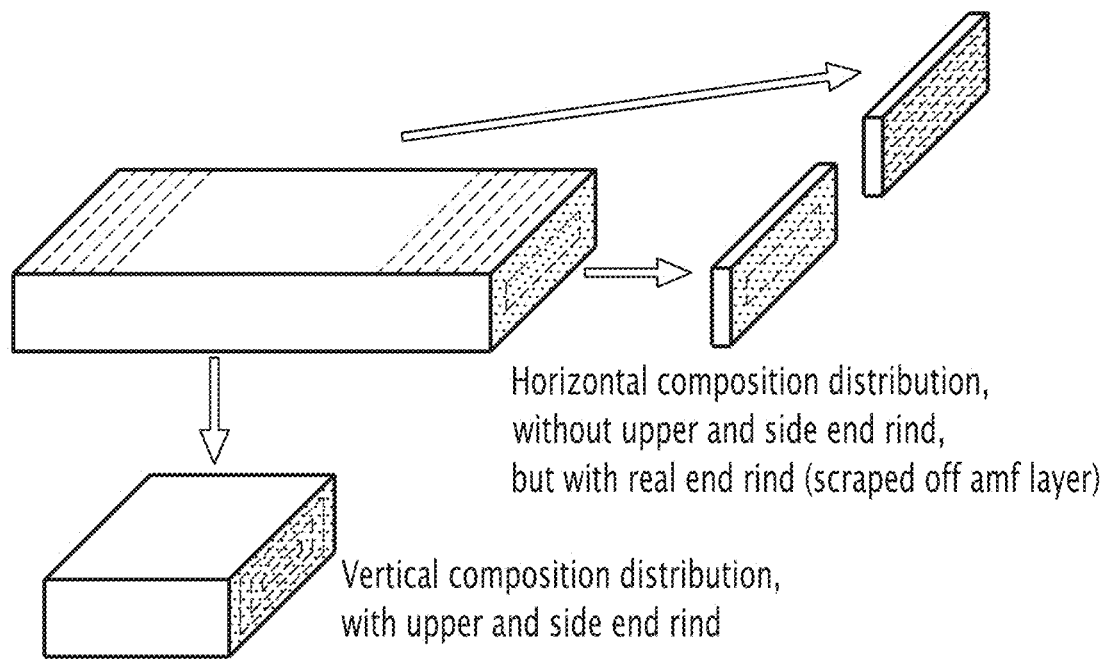
FIG. 6 is a scheme of the general sampling method used to investigate possible composition gradients within the cheese in Example 2.

FIG. 6 shows the sampling method used to investigate possible composition gradients within the cheese. The measurement was performed for a cheese obtained with the method depicted in Example 1 and a reference Leerdammer Original cheese.

This composition was analyzed at the end of the ripening period to not only see the effect of the hydrophobic barrier on the salt, moisture and fat content, but also on the chemical composition of the cheese.

Longitudinal Axis

Figure 7:
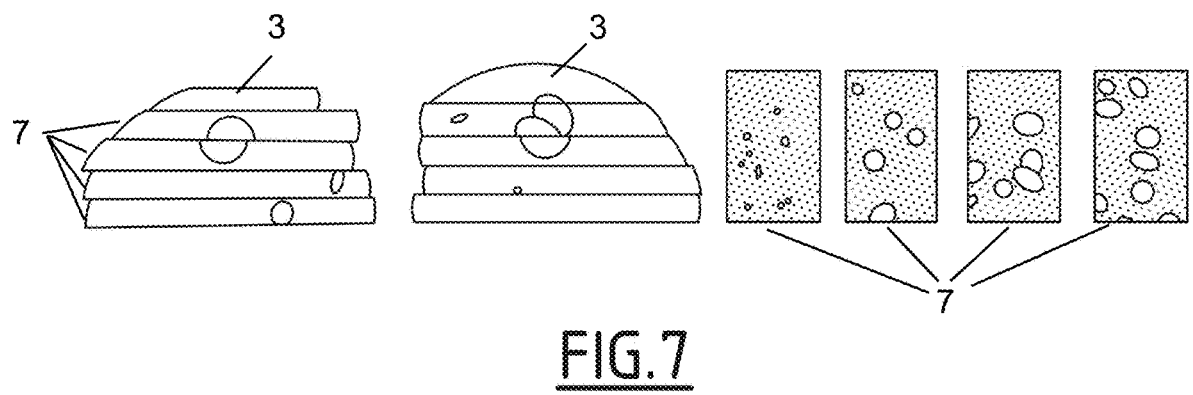
FIG. 7 is a scheme of the sampling method used to investigate longitudinal composition gradient within the cheese in Example 2.

The highly appreciated composition gradient is sought in the longitudinal axis of the cheese. From the end rind (3) counting, four slices (7) of 2 cm thick were cut from the cheese block. The rinds of the slices were stripped off (2 cm in each direction) to make sure that only the longitudinal gradient would be analyzed. This sampling method is depicted in FIG. 7.

The concentration in propionic acid (mg/kg) and succinic acid (mg/kg), the NaCl in dry matter content (% w/w) and the moisture content (% w/w) in the treated cheese and in a control cheese were determined in the first four slices of 2 cm thick.

Figure 8:
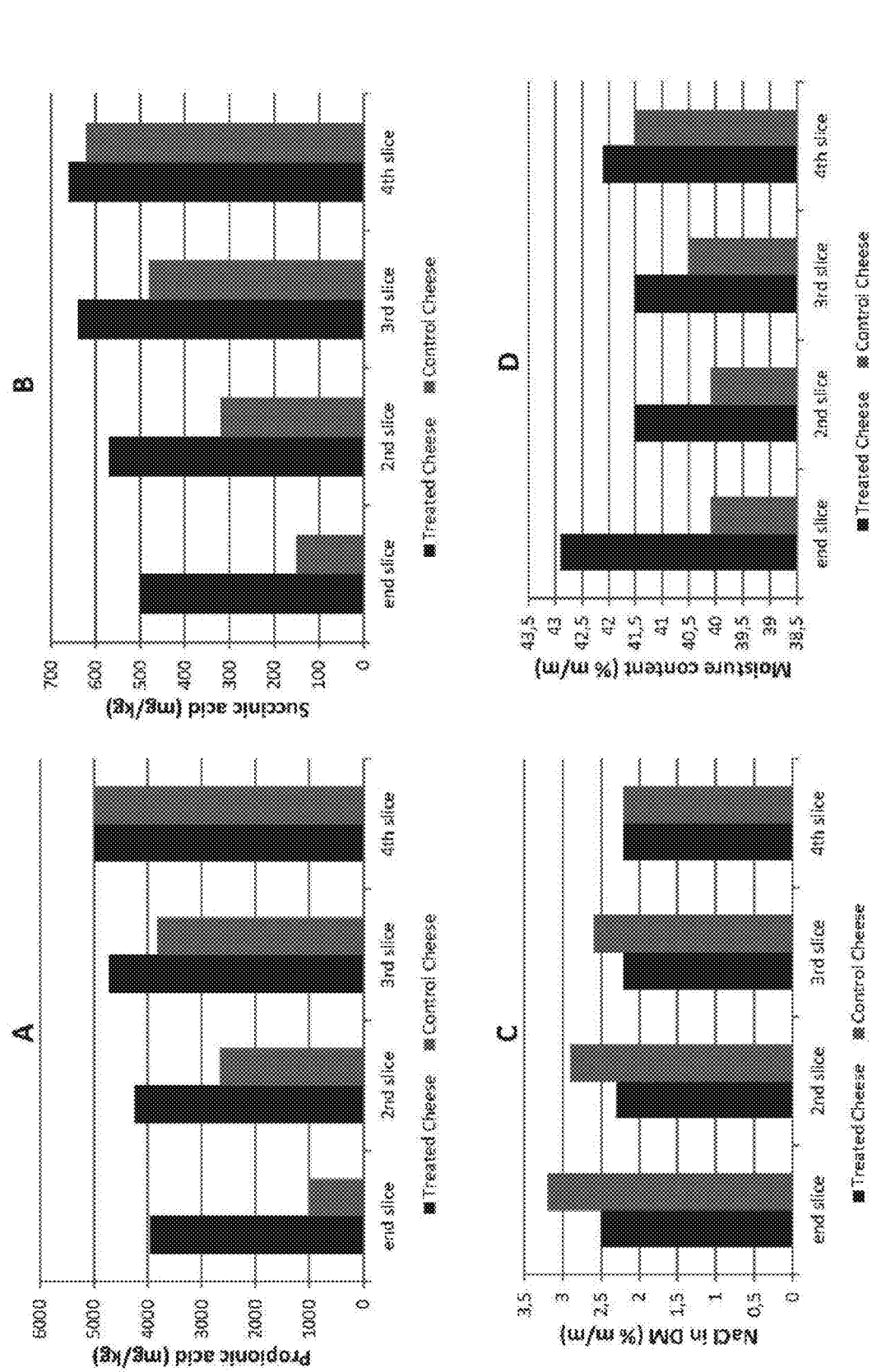
FIG. 8 is a set of histograms displaying the propionic acid content (A), succinic acid content (B), NaCl in dry matter (C) and moisture content (D) in the cheese of the invention compared to a control cheese, in the end slice, the $2^{nd}$ slice, $3^{rd}$ slice and 4th slice of the cheese in the longitudinal axis.

The results are shown on FIG. 8.

What is especially clear from these graphs is that the gradient for the treated cheese is much lower than for a control cheese. The hydrophobic barrier created a lower and more stable salt content in the end rind. This lower salt content in combination with a higher moisture content leads to a higher propionic acid activity which is clearly visible in the amount of propionic acid and succinic acid found that are respectively direct and indirect byproducts of the propionic acid bacteria activity. In the fourth slice, 6-8 cm in the cheese, the composition was similar in terms of propionic acid, succinic acid, and salt in dry matter. Core quality was reached at this point.

This was also shown in the defective slices count as there were no defective slices found at this point among 30-40 slices.

Lateral and Vertical Axis

The hydrophobic barrier, since only applied on the outer parts of the cheese located at the ends of the longitudinal axis, should not create a compositional difference in the lateral and vertical axis.

Lateral Axis in the End Rind

Figure 9:
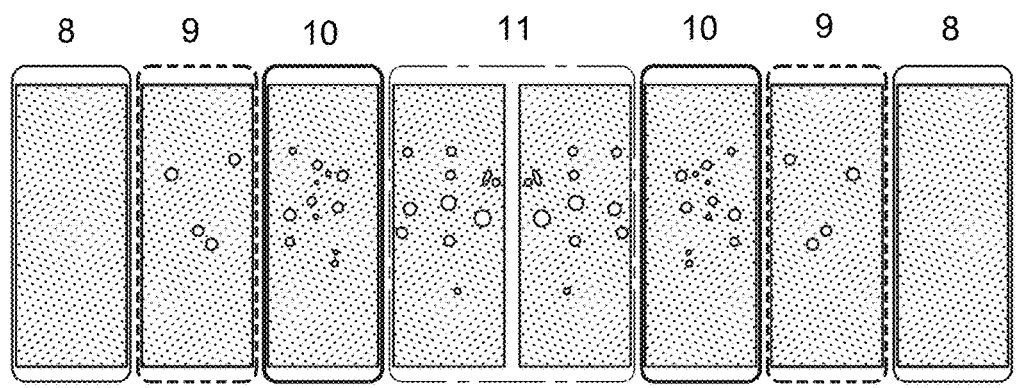
FIG. 9 is a scheme of the sampling method used to investigate lateral composition gradient in the end rind of the cheese in Example 2.
Figure 10:
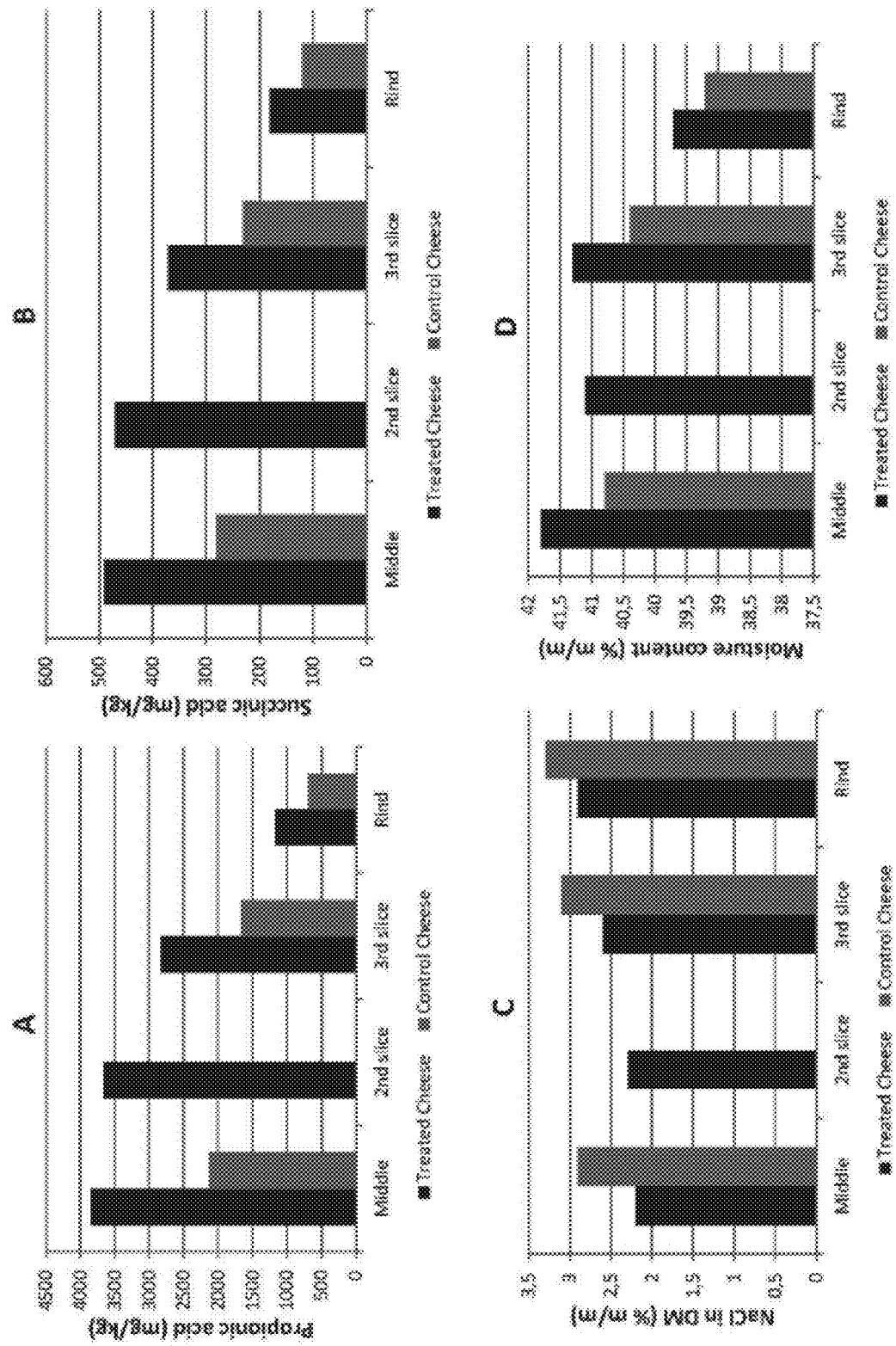
FIG. 10 is a set of histograms displaying the propionic acid content (A), succinic acid content (B), NaCl in dry matter (C) and moisture content (D) in the cheese of the invention compared to a control cheese, in the middle slice, the $2^{nd}$ slice, $3^{rd}$ slice and the rind of the cheese in the lateral axis.

Samples taken for the analysis of compositional gradient in the lateral axis in the end rind were only taken from the first 4 centimeters of the block with a scrap of hydrophobic barrier as shown in FIG. 9. This explains the compositional differences between the control and the treated cheese shown in FIG. 10. For the control cheese, salt entered the cheese from the end rind (8) and thus further lowered the moisture content and propionic bacteria activity in the first centimeters of the cheese block. Also shown going in from the end rind (8) are third (9), second (10) and middle (11) slices.

A gradient was, however, shown for both the treated cheese and the control cheese. The hydrophobic barrier thus did not prevent salt and moisture migration from both the lateral and vertical sides of the treated cheese.

Lateral and Vertical Axis in the Core of the Cheese Block

Figure 11:
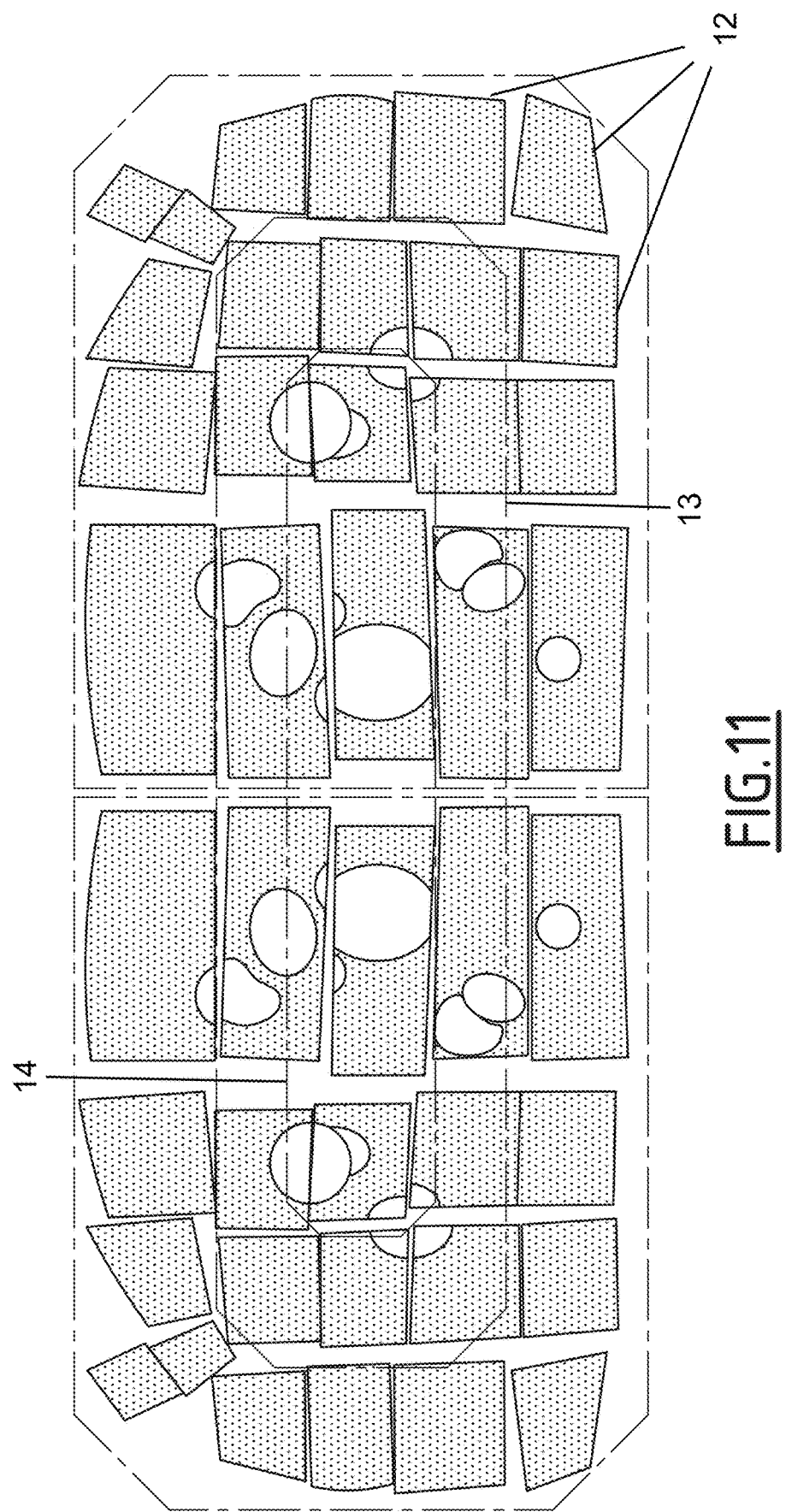
FIG. 11 is a scheme of the sampling method used to investigate lateral and vertical composition gradient in the core of the cheese block in Example 2.

In the core of the block, samples were taken from three different depths. First of all, the rinds (12), just inside the outer dashed boundary, were cut off (2 cm). Second, the "in between" slices (13), defined by being just inside of the intermediate dashed boundary were cut off (2 cm). The last sample was the so called "core of the core" (14), defined by the innermost dashed boundary. This sampling method is depicted in FIG. 11. With this method the composition difference in the lateral and vertical axis in the core of the block was analyzed.

For the core of the cheese block, core quality was assumed and no difference between the treated cheese and the reference Leerdammer Original block was expected.

Figure 12:
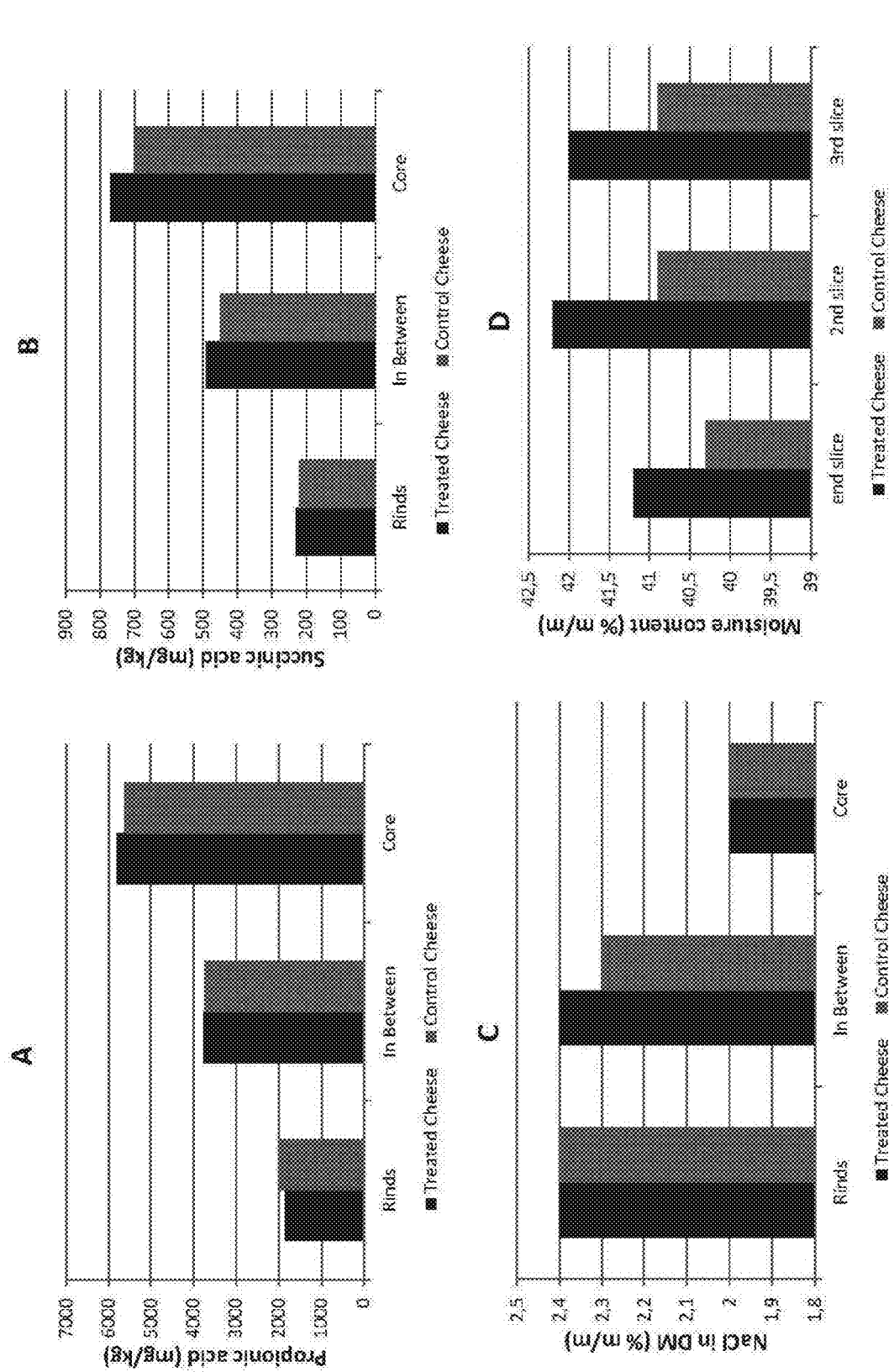
FIG. 12 is a set of histograms displaying the propionic acid content (A), succinic acid content (B), NaCl in dry matter (C) and moisture content (D) in the cheese of the invention compared to a control cheese, in the rinds, the "in between" slice and the core in the core of the cheese in the lateral and vertical axis.

FIG. 12 shows that both cheeses were very similar. The only difference found was for the moisture content. This moisture difference was likely to have been caused by cheese compositional differences from the beginning or slightly different pressing and/or brining times.

When they compared the end rind core composition to that of the "core of the core", the inventors observed that the treated cheese was much closer (68% of the core propionic acid and 65% of the core succinic acid) to this core quality than the control cheese (17% of the core propionic acid and 20% of the core succinic acid) already in the first 2 cm of the cheese.

These results thus confirm that the brine-salted cheese according to the invention displays a different composition from a control cheese, which explains its better qualities in the end rinds.

The invention claimed is:

1. A method for manufacturing brine-salted cheese having an outer surface, wherein the outer surface comprises a first exterior portion and a second exterior portion, said method further comprising providing the cheese with a homogeneous salt distribution and/or homogeneous organic acid distribution and/or homogeneous eyes distribution and/or texture within the brine-salted cheese along a length that is parallel to the second exterior portion, wherein the method comprises, before brining, applying a hydrophobic barrier only on the first exterior portion, such that the second exterior portion lacks the hydrophobic barrier, and wherein said hydrophobic barrier is kept on said first exterior portion at least during part of the brining.

2. The method according to claim 1, wherein the hydrophobic barrier comprises a waxy layer covered by a protective layer.

3. The method according to claim 2, wherein the waxy layer comprises a native animal fat, a blend of animal fats, a vegetable fat, a blend of vegetable fats, a mineral wax from non-renewable origin, a bio sourced wax from animal or vegetable origin or blends of these waxes.

4. The method according to claim 2, wherein the waxy layer is a dairy fat layer.

5. The method according to claim 4, wherein the dairy fat layer comprises anhydrous milk fat or butter.

6. The method according to claim 2, wherein the protective layer comprises a plastic layer or a casein layer.

7. The method according to claim 6, wherein the plastic layer comprises polyethylene, including high-density polyethylene and low-density polyethylene, polypropylene, polyisoprene, polybutadiene, polyethylene terephthalate, polyvinyl acetate and/or polyester.

8. The method according to claim 1, wherein the brine-salted cheese is in the form of a rectangular block having a longitudinal axis, wherein the rectangular block has an upper surface, a bottom surface, a first side surface, a second side surface, a third side surface and a fourth side surface, the first side surface being located parallel to the third side surface, wherein the first exterior portion comprises the first and third side surfaces, wherein the upper and bottom surfaces, and second and fourth side surfaces extend along the longitudinal axis, and the first and third side surfaces extend transversely to the longitudinal axis.

9. The method according to claim 1, wherein the brine-salted cheese is in the form of a wheel having a top surface, a bottom surface and an outer circumferential surface that connects the top surface and the bottom surface, wherein the first exterior portion comprises the outer circumferential surface.

* * * * *